United States Patent

[11] 3,553,490

[72] Inventor John O. G. Darrow
 Murrysville, Pa.
[21] Appl. No. 706,915
[22] Filed Feb. 20, 1968
[45] Patented Jan. 5, 1971
[73] Assignee Westinghouse Air Brake Company
 Swissvale, Pa.
 a corporation of Pennsylvania

[54] LEVEL DETECTOR AMPLIFIER WITH CONTROLLABLE DEGENERATIVE FEEDBACK
 16 Claims, 1 Drawing Fig.
[52] U.S. Cl. ...................................... 307/235,
 246/187; 330/24, 330/86, 330/110
[51] Int. Cl. ...................................... H03k 5/20
[50] Field of Search .......................... 307/235;
 330/86, 110, 24; 246/167, 187(A)

[56] References Cited
UNITED STATES PATENTS

| | | | |
|---|---|---|---|
| 3,030,022 | 4/1962 | Gittleman | 330/24X |
| 3,106,684 | 10/1963 | Luik | 330/86X |
| 3,221,262 | 11/1965 | Houpt | 330/24X |
| 3,281,639 | 10/1966 | Potter et al. | 307/235X |

Primary Examiner—Stanley T. Krawczewicz
Attorneys—W. L. Stout and John B. Sotak

ABSTRACT: A fail-safe level detector comprising an AC amplifier circuit and a voltage breakdown device for controlling the amount of degenerative feedback so that sufficient gain for producing an AC output signal only occurs when a predetermined level of DC voltage causes the breakdown device to conduct and to assume its low dynamic impedance condition.

PATENTED JAN 5 1971
3,553,490
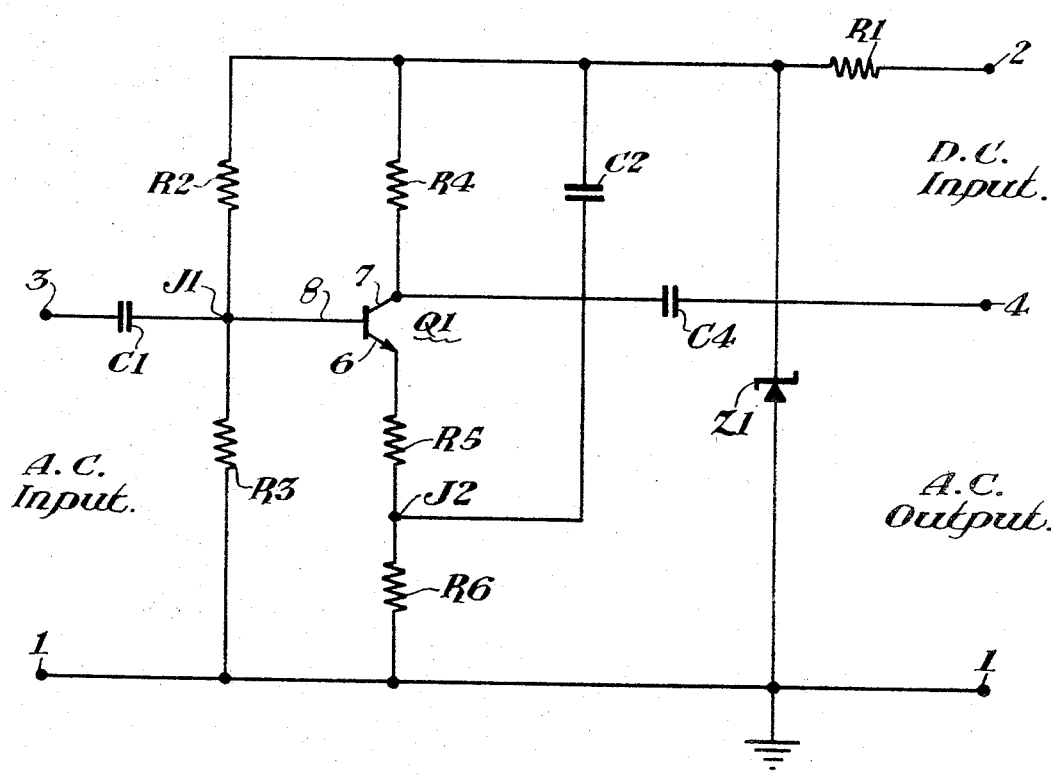
INVENTOR
John O. G. Darrow.
BY
W. L. Stout.
HIS ATTORNEY

LEVEL DETECTOR AMPLIFIER WITH CONTROLLABLE DEGENERATIVE FEEDBACK

My invention relates to a fail-safe amplitude level detector and more particularly to a fail-safe circuit arrangement employing an AC amplifier and the voltage and dynamic impedance characteristics of a breakdown device for producing an AC output signal when and only when the amplitude of a DC input exceeds a predetermined value.

In various automatic control systems safety is of paramount importance. For example, in vehicle speed detection arrangements for mass and/or rapid transit operations, it is mandatory to determine the actual speed of a moving vehicle and thereafter to compare the actual speed with the prescribed speed command request for a given area or section in order to prevent injury to individuals and damage to equipment. That is, in such systems, it is a peremptory safety requirement that under no circumstances should the actual speed of the moving vehicle exceed the preselected speed command request for any given area. In one particular arrangement, the actual speed of a moving vehicle is derived by suitable speed sensing apparatus, such as an axle driven frequency generator which delivers AC signals having a frequency directly proportional to the vehicular velocity. These AC signals obtained from the frequency generator are, in turn, applied to a suitable voltage limiter which prevents an excess voltage swing in either direction and provides that the signal amplitudes will be substantially constant. These limited signals are, in turn, applied to a suitable fail-safe low-pass filter which is selectively chosen to have an upper frequency limit corresponding to the speed command request for the particular area. Accordingly, the filter will only pass signals having frequencies below the upper frequency level. It will be appreciated that as the vehicle moves from one area to the next, the upper frequency limit may be automatically controlled by varying the filter components and their values or by selecting one of a plurality of low-pass filter circuits in accordance with the prescribed command request for each given area. The AC output signals taken from the low-pass filter may, in turn, be converted by a fail-safe rectifier to provide a DC output voltage which is proportional thereto. Accordingly, if it is desired to insure that a vehicle is proceeding at a speed below some preselected value, it is merely necessary to measure the amplitude of the DC output signals supplied by the rectifier. However, as in all vital portions of such speed command control systems, this measuring function must be performed by fail-safe apparatus which will not provide an output signal when the vehicle is moving in excess of the preselected command request. That is, it is of the utmost importance to exercise extreme care in designing and constructing this portion of the apparatus in order to maintain the security and integrity of the overall system. Accordingly, it is readily evident that the detection apparatus must operate in a fail-safe manner so that any conceivable and foreseeable failure will result in a condition as least as restrictive and preferably more restrictive than that preceding the failure. For example, in such apparatus a circuit malfunction or component failure should not be permitted to erroneously simulate or indicate a condition for holding or maintaining the vehicle's speed, and normally, it is preferred that the failure should either provide a warning such as flashing a light, sounding a buzzer, or initiate a braking action for stopping the vehicle. Thus, in order to insure the highest degree of safety to individuals as well as apparatus, it is necessary and essential that under no circumstances will a failure cause or be capable of simulating a true or valid speed indication.

Accordingly, it is an object of my invention to provide a new and improved fail-safe circuit arrangement.

A further object of my invention is to provide a unique amplitude level detector circuit which operates in a fail-safe manner.

Another object of my invention is to provide an improved semiconductive circuit arrangement which will provide an output signal when and only when the amplitude of an input exceeds a predetermined value.

Yet another object of my invention is to provide a fail-safe level detector for measuring the amplitude of a DC input and only producing an AC output signal when the amplitude of the DC input exceeds a predetermined level.

Still another object of my invention is to provide a fail-safe circuit arrangement for providing an AC output signal when and only when the amplitude of the DC supply voltage exceeds the preselected value.

Still yet another object of my invention is to provide a fail-safe amplitude level detector employing the dynamic impedance characteristics of a breakdown device for controlling the gain of an AC amplifier.

Still yet a further object of my invention is to provide a transistorized level detector which operates in a fail-safe manner to produce an output signal when and only when an input exceeds a predetermined level.

A still further object of my invention is to provide a feedback-type of amplifier which is only capable of amplifying an AC input when a DC input causes a voltage device to breakdown and assume its low dynamic impedance condition.

Yet still another object of my invention is to provide a fail-safe circuit arrangement which is simple in construction, economical in cost, efficient and reliable in operation.

Briefly, the fail-safe level detector of the present invention employs an AC amplifier circuit and a voltage breakdown device. The amplifier includes a transistor amplifying device having a degenerative feedback circuit. The degenerative feedback circuit is suitably interconnected by the voltage breakdown device to the transistor for controlling the amount of feedback voltage and, in turn, the gain of the amplifier. Normally, the voltage breakdown device exhibits a high dynamic impedance and only assumes a low dynamic impedance condition when a DC input voltage exceeds the breakdown voltage of the device. Accordingly, the amplifier will only produce an AC output signal when a DC input voltage exceeds a predetermined amplitude for causing the breakdown device to conduct and assume its low impedance condition so that the amplifier gain is increased due to the decrease in degenerative feedback.

The foregoing objects and other attendant features and advantages will be more readily appreciated as the subject invention becomes better understood by reference to the following detailed description when considered in conjunction with the accompanying drawings wherein:

The single FIG. is a schematic circuit diagram of a fail-safe level detector in accordance with the present invention.

As is well known, a feedback type of amplifier may be defined as an electronic circuit in which a portion of the amplified output signal is fed back to the input terminals. When the feedback signal is out of phase with the input and decreases the gain of the amplifier, it is commonly referred to as negative feedback, degenerative feedback or simply degeneration. While inadvertent feedback generally always occurs in electronic circuits, the most common type of deliberate current controlled feedback, in transistor circuits, is emitter degeneration. As will be described in greater detail hereinafter, by controlling the impedance characteristic of the emitter electrode connection, the amount of degenerative feedback and, in turn, the given losses therein may be employed to control the amplification qualities of the transistor amplifier. That is, a high value of emitter impedance will proportionally increase the negative or degenerative feedback which therefore materially reduces the gain of the amplifier thereby effectively reducing the output of the amplifier. The present invention makes use of this operating principle in a unique manner wherein the condition of an amplifier is effectively controlled and an AC output signal is only available when the magnitude of a DC input exceeds a predetermined value.

Referring to the single FIG. of the drawing, there is shown a preferred embodiment of the electronic amplitude level detector of the present invention. As previously mentioned, the amplitude voltage level detector operates in a fail-safe manner to measure the amplitude of a DC input voltage which is representative of the actual speed of the moving vehicle in an automatic speed control system. That is, the DC input voltage supplied by the speed sensing apparatus is inversely proportional to vehicle speed and is shown applied to the input terminals 1 and 2. As shown, a current limiting resistor R1 has one of its ends connected to the input terminal 2 and the other end connected to the cathode of the zener diode Z1 the anode of the zener diode Z1 is connected to the other input terminal 1 which is appropriately grounded thereby forming a common terminal. The resistor R1 and zener diode Z1 form a voltage regulator which stabilizes and provides a substantially constant operating and biasing supply voltage for improved operation. In addition to its voltage regulating feature, the voltage breakdown device or zener diode also exhibits the unique characteristics of having a high dynamic impedance condition when not conducting and of having a low dynamic impedance condition when rendered conductive and operating properly. As will be described in greater detail hereinafter, this unique characteristic is employed in the present invention for insuring that the level detector operates in a fail-safe manner.

A voltage dividing network consisting of series connected resistors R2 and R3 is connected in parallel across the zener diode Z1. The resistive values of the voltage dividing network are selected to provide the proper forward biasing potentials for the base-emitter electrodes of the NPN transistor Q1 which forms the amplifying or active element of the amplifier circuit. The transistor Q1 includes a common emitter electrode 6, an output collector electrode 7 and an input base electrode 8. As shown, base electrode 8 is directly connected to the junction point J1 of the voltage dividing network comprising resistors R2 and R3. A capacitor C1 is connected between the junction point J1 for blocking the DC voltage from the signal source and for coupling the input AC signals to the base electrode 8.

As shown, an AC input signal, which may be derived from any convenient signal source, such as a suitable sinusoidal oscillator or pulse generator, is applied across input terminal 3 and common terminal 1. The collector electrode 7 is connected to the upper portion of the voltage divider network and, in turn, to the cathode of the zener diode Z1 by collector load resistor 4. The emitter electrode 6 is connected through resistors R5 and R6 to the common grounded terminal 1. While it is well known that the external emitter swamping resistors R5 and R6 temperature stabilize the biasing conditions for improving amplifier operation, it is also evident that the resistors R5 and R6 result in series degeneration which causes an increase in input resistance and a decrease in the gain of the amplifier. Generally, the latter conditions may be resolved by simply placing a suitable bypass impedance, such as a capacitor, in parallel with the emitter resistance to provide a low impedance path for the AC signal. Accordingly, a bypass capacitor C2 is shown connected from the junction point J2 resistors R5 and R6 to the cathode of the zener diode Z1 It has been found that by uniquely employing this principle of operation, the amount of negative feedback and, in turn, the gain of an amplifier may be effectively controlled by varying the impedance of the capacitive bypass circuit. That is, since maximum degeneration occurs when the emitter resistance is not bypassed and since minimum degeneration occurs when the emitter resistance is bypassed by through capacitor C2, the amplifier gain and, in turn, amplifying characteristics may be effectively controlled. Therefore, by suitable proportioning resistors R4, R5 and R6 so that the effective base-to-emitter voltage is substantially equal to the AC input signal when the resistor R6 is bypassed and so that the AC base-to-emitter signal is effectively zero when the resistor R6 is unbypassed, the transistor amplifier may either have a relatively high gain or have a comparatively low gain, respectively. For example, a gain ratio of at least 20 to 1 is possible where G (bypass) $\simeq \frac{R4}{R5}$ (assuming the load impedance> R4) and G (unbypass) $\simeq \frac{R4}{R5}+R6$. As shown, the collector electrode 7 is preferably connected to the AC output terminal 4 through capacitor C4 for isolation purposes. It will be appreciated, that the AC output developed across output terminals 4 and 1 may be applied to any suitable utilization device, such as a vital type of underspeed relay after being appropriately amplified and rectified, the purpose of which will be described hereinafter.

Turning now to the operation, it will be initially assumed that the moving vehicle is proceeding at or below the preselected speed command request so that the DC signals generated by the speed sensing apparatus and applied to the DC input terminals 1 and 2 are above a preselected or predetermined level. As previously mentioned, the speed sensing apparatus is only capable of generating a sufficient level of DC voltage when the vehicle is proceeding at a speed lower than a preselected speed command request for the particular area. The voltage breakdown characteristic of the zener diode Z1 is appropriately selected to require a potential level substantially equal to the voltage level of the sensing apparatus when the vehicle is moving below the preselected speed command request. Accordingly, under this condition the DC input voltage is of sufficient magnitude to cause the Zener diode Z1 to breakdown thereby causing the diode to conduct and exhibit a low dynamic impedance. Since the voltage across the zener diode remains substantially constant over a wide range of voltage and current changes, the various biasing voltages supplied to transistor amplifier insure stable operation. With the zener diode conducting and exhibiting a low impedance the resistor R6 becomes bypassed by capacitor C2 so that only a prescribed amount of negative feedback voltage developed across resistor R5 is present. The purpose of this limited amount of feedback insures that full gain of the amplifier is of a controllable amount. Since a low impedance path now extends from the junction point J2, through bypass capacitor C2, through the zener diode Z1 to the common terminal 1, little, if any, negative feedback voltage is developed across resistor R6. Accordingly, the AC input signals applied to input terminals 3 and 1 are amplified, and an AC output signal is provided across the output terminals 4 and 1. It will be appreciated that the amount of AC output power which is available at the collector electrode 7 is a function of the amplifier gain minus the feedback power. As previously mentioned, this AC output signal on terminals 4 and 1 after suitable amplification and rectification may, in turn, be employed to energize an underspeed relay thereby indicating that the speed of the vehicle is not in excess of the preselected command request. That is, the presence of an AC output signal of a given amplitude at the terminals 4 and 1 may be construed as a true or valid indication that the vehicle is proceeding at or below the preselected speed command request.

Let us now assume that the actual speed of the vehicle increases to a point beyond the predetermined speed command request so that the circuit operation may be analyzed under this condition. Under this condition, the axle generator now produces a signal of increased frequency. These higher frequency signals are greatly attenuated due to the inherent rejection characteristics of the low-pass filter, so that the DC output produced by the rectifier network is proportionally reduced at this time. Accordingly, the level of DC input voltage applied to terminals 2 and 1 is substantially below the zener threshold or breakdown voltage of the diode Z1. Now with an insufficient magnitude of DC voltage applied across the zener diode Z1, the diode will not conduct and will exhibit a high dynamic impedance. In view of the high impedance condition of the zener diode Z1, the capacitive bypass circuit extending from the junction point J2 of the resistors R5 and R6 to the common terminal 1 will appear as an open circuit and, therefore, an appreciable amount of negative feedback voltage will be developed across resistor 6. In practice, the resistive value of resistor R6 is chosen to be relatively high so that the gain of the amplifier is proportionally reduced. That is, since the negative feedback voltage now developed across resistors R5 and R6 is greatly increased, the effective AC base-to-emitter voltage is substantially zero. Accordingly, under this condition no appreciable AC signal voltage is available at the terminals 4 and 1 and, therefore, the underspeed relay will become deenergized thereby signifying that the vehicle is now proceeding at the speed above the preselected speed command request for the given area. The deenergization of the underspeed relay may, in turn, cause the energization of a suitable alarm, such as lighting a lamp or sounding a buzzer, or may initiate an automatic braking action to slow down or stop the vehicle entirely.

As previously mentioned, the amplitude level detector must operate in a fail-safe manner so that no conceivable component or circuit failure will be capable of producing an AC output signal on the output terminals 4 and 1 at any time. It has been found advantageous to chose a relatively high value of resistance for resistor R1 in order to insure that a capacitive bypass circuit cannot be established from junction point J2, through capacitor C2 and, in turn, through resistor R1 to terminal 4 and through the DC input source to terminal 1. Further, it will be noted that if the zener diode becomes short circuited, the necessary biasing or supply voltages are not available and, therefore, the required amplifying characteristic of the transistor are not functional. If the zener diode becomes open circuited, it is quite apparent that the required low impedance bypass path between the junction point J2 and common terminal 1 is not present so that maximum degeneration occurs and no appreciable AC voltage is again available at the output terminals 4 and 1. If the zener diode becomes leaky and conducts at some voltage lower than its normal breakdown voltage, the dynamic impedance exhibited by the diode is still generally sufficient to cause an appreciable amount of degeneration to overcome the gain of the amplifier and, therefore, the amount of AC voltage available across terminals 4 and 1 is insufficient to cause energization of the relay. An open-circuit failure of the current limiting resistor R1 is obviously a safe condition. Normally, fail-safeness is based on the premise that resistors or resistive elements cannot become short circuited due to the particular type of resistors, namely, carbon-composition, employed in circuits which must operate in a fail-safe manner. It will be noted that the various other components and elements constituting the amplifier circuit will either fail in a safe manner or destroy the circuit integrity to the point where an AC output signal is not produced. Therefore, it will be observed that the presently described level detector operates in a fail-safe manner so that an AC output signal is available at the output terminals 4 and 1 when and only when a predetermined value of DC input is applied to the input terminals 2 and 1.

Further, it may be mentioned that the circuit parameters of the described detector have been selected to preferably employ a zener diode having a "threshold" or breakdown voltage in the range of 6 to 8 volts in that no presently known diode in this range can conduct at a lower than rated zener voltage and yet exhibit a low dynamic impedance. However, it is readily understood that zener diodes having other voltage zener ratings may equally well be employed when it is possible to positively insure that when the diode breaks down at a lower than its rated zener voltage, it will not exhibit a low impedance condition.

Also, it will be appreciated that while the present invention has been described in terms of zener diodes and transistor amplifiers, it is readily understood that other voltage stabilizing or breakdown devices such as neon glow or gas regulator tubes and that other amplifying devices such as gas or vacuum tubes may be employed with equal success.

Although a common-emitter configuration and an NPN transistor have been illustrated, it is understood that common-collector or common-base configurations as well as transistors of opposite conductivity, that is, PNP transistors may be used in practicing the present invention by merely reversing the polarity of the direct current input and of the zener diode as is well known.

In addition, it will be appreciated that while an emitter degeneration amplifier circuit has been illustrated in practicing the present invention, it is readily understood that various other types of feedback amplifiers employing series or shunt degeneration circuits may be equally used in practicing the subject invention.

Further, it will also be appreciated that while this invention finds particular utility in speed control systems, it is readily evident that the invention is not merely limited thereto but may be employed in various other systems and apparatus which require the security and safety inherent in the invention. But regardless of the manner in which the invention is used, it is understood that various alterations may be made by persons skilled in the art without departing from the spirit and scope of this invention. It will also be apparent that other modifications and changes can be made in the presently described invention, and, therefore, it is understood that all changes and equivalents and modifications within the spirit and scope of this invention are herein meant to be included in the appended claims.

I claim:

1. A fail-safe level detector for producing an output signal when and only when an input exceeds a predetermined value comprising a first amplifying means having degenerative feedback and a second means electrically connected to said first means for controlling the biasing supply voltage and said degenerative feedback whereby said first amplifier means is only capable of producing said output when said input exceeds said predetermined value.

2. A fail-safe level detector as defined in claim 1, wherein said first means comprises a feedback type of amplifier.

3. A fail-safe level detector as defined in claim 1, wherein said first means comprises a semiconductive amplifier circuit.

4. A fail-safe level detector as defined in claim 3, wherein said amplifier circuit includes a solid state device having a swamping resistor.

5. A fail-safe level detector as defined in claim 3, wherein said amplifier circuit includes a transistor having an emitter load resistor.

6. A fail-safe level detector as defined in claim 3, wherein said amplifier circuit comprises a common-emitter configuration.

7. A fail-safe level detector as defined in claim 3, wherein said amplifier circuit includes a controllable series degeneration circuit.

8. A fail-safe level detector as defined in claim 1, when said second means includes a voltage breakdown device.

9. A fail-safe level detector as defined in claim 1, wherein said second means comprises a voltage responsive device having a relatively high impedance value when nonconducting and a relatively low impedance value when conducting.

10. A fail-safe level detector as defined in claim 8, when said voltage breakdown device comprises a zener diode.

11. A fail-safe circuit arrangement comprising, a feedback type of transistor amplifier, and a voltage breakdown device electrically coupled to said transistor amplifier for controlling the biasing supply voltage as well as the amount of feedback and, in turn, the gain of said transistor amplifier whereby an output signal is produced when and only when said breakdown device becomes conductive and assumes a low impedance condition.

12. A fail-safe circuit arrangement as defined in claim 11, wherein said amplifier includes a series degeneration circuit.

13. A fail-safe circuit arrangement as defined in claim 11, wherein said amplifier comprises an emitter swamping resistor and a controllable bypass capacitor.

14. A fail-safe circuit arrangement as defined in claim 11, wherein said voltage breakdown device comprises a zener diode.

15. A fail-safe circuit arrangement as defined in claim 11, wherein said transistor amplifier comprises a common-emitter configuration.

16. A fail-safe circuit arrangement comprising, a DC input, an AC input, an AC output and a common terminal, a series connected current limiting resistor and zener diode electrically connected between said DC input and said common terminals, a voltage dividing network including a first and a second connected across said zener diode, a transistor having an emitter, a collector and a base electrode, the base electrode connected to the junction point of said first and said second resistors of said voltage dividing network, a third resistor connecting the collector electrode to the junction of said series connected current limiting resistor and zener diode, a series connected fourth and fifth resistors connecting the emitter electrode to said common terminal, a bypassing capacitor connected between the junction point of said fourth and fifth resistors and the junction of said current limiting resistor and zener diode, a coupling capacitor connected between the junction point of said first and said second resistors and the AC input terminal whereby AC output signals are present on said AC output terminal when and only when a DC voltage of sufficient amplitude is present on said DC input terminal to cause said zener diode to conduct and assume a low dynamic impedance condition.